United States Patent [19]

Cargile

[11] Patent Number: 5,257,660
[45] Date of Patent: Nov. 2, 1993

[54] THERMAL TRANSPORT OSCILLATOR

[75] Inventor: Douglas B. Cargile, West Sacramento, Calif.

[73] Assignee: Aaron J. Cargile, West Sacramento, Calif.

[21] Appl. No.: 907,773

[22] Filed: Jun. 30, 1992

[51] Int. Cl.⁵ .............................................. F28D 15/02
[52] U.S. Cl. .................................. 165/104.22; 417/209
[58] Field of Search .................... 165/104.22; 417/209, 417/209

[56] References Cited

U.S. PATENT DOCUMENTS 3,053,198  9/1962  Staehle et al. ...................... 417/209
4,930,570  6/1990  Ohayasa ...................... 165/104.22 X

*Primary Examiner*—John C. Fox

[57] ABSTRACT

A devise useful to transport thermal energy from a hot zone to a cold zone, over distance, and around or through obstructions, comprising: evaporator (101), switch-valve assembly (300), two condensers (501), (502), check-valves, interconnecting passageways, and a liquid-vapor phase-change working fluid. The motive power causing the devise operation is exclusively thermal. Thermal energy is continuously accepted at the evaporator and continuously rejected at the condensers. The switch-valve directs vapor through open ports to one condenser at a time. The vapor pressure in that chamber increases and creates a pressure differential between the two condensers. When this difference in pressure reaches a predetermined magnitude, the switch-valve changes condensers. The evaporator vapor pressure is pulled low by the newly opened condenser and the higher vapor pressure in the just closed condenser pumps its condensate back to the evaporator. The cycle continues alternating between condensers.

3 Claims, 8 Drawing Sheets

THERMAL TRANSPORT OSCILLATOR

BACKGROUND

1. Field of the Invention

This invention relates to mechanisms which transport thermal energy and more particularly, is concerned with a type of closed system in which the thermal transfer is accomplished primarily by movement of working fluid mass in a liquid-vapor phase-change cycle, and the motive power causing the device operation is thermal in nature.

2. Discussion of Prior Art

The increasing importance of thermal transport technology is indicated by the broadening of the areas of its application. Manufacturing processes, heat recovery, electronics cooling, air conditioning, solar energy collection, motor and engine cooling, and thermal management in outer-space structures, share a common requirement; to wit, that systems be installed which will facilitate and control the transportation of thermal energy.

Consider two regions which exhibit a measurable difference in temperature, a hot zone termed heat-source and a cold zone termed heat-sink. There are requirements to move thermal energy over separating distances and around obstructions, from the source to the sink, using a thermal-powered devise. Certain phase-change thermal transport devises have been developed in order to satisfy these requirements.

In a phase-change system the thermal-powered vapor phase circulation, i.e. the evaporation of a liquid, transport of the vapor through a duct, and subsequent condensation, is a well known method for transporting thermal energy. This action is efficient and consistently employed in all such devises under consideration. However, in order for the devise to cycle continuously, the condensate must be returned to the evaporator.

Hitherto in the considered known devises, the motive power for the liquid phase circulation has been derived mainly from one of two natural forces: the force of gravity, in a devise known as a thermosyphon; or, the force of capillary action, in a devise known as a heat pipe. When properly installed, either of these devises works well; however each has specific disadvantages.

Thermosyphons must be configured so that the condenser is located above the evaporator with respect to the gravitational field. In a system so configured, the condensate will run downhill to the evaporator. Conversely, if the evaporator is located above the condenser the working fluid liquid cannot circulate. This constraint precludes use of this system to transfer thermal energy in opposition to gravitational forces. Such devises cannot be used in instances where the heat-source is located above the heat-sink. Further, such devises will not work in an environment that lacks a gravitational field.

Heat pipes can transfer thermal energy in opposition to gravitational forces and they work well in zero-gravity or microgravity environments; however, such devices are constrained by the relative weakness of capillary force. In practice, the distance which capillary force can move liquid working fluid has been limited. The velocity of the liquid movement through a capillary passageway is necessarily slow, consequently the rate of thermal transfer is restricted. Further, a thermal overload will cause a vapor plug in the capillary structure which will shut down the thermal transfer until such time as the vapor can dissipate. As demonstrated in practice, drying of the wick limits the thermal transport capacity of a heat pipe system. This drying occurs when the liquid is boiled off at the evaporative region faster than the capillaries can return it from the condensing region.

Thermosyphons and heat pipes have advantages as well. In a properly installed system both gravitational and capillary forces are self-starting, in that the devise operation begins automatically when the temperature of the heat-source rises above the temperature of the heat-sink the necessary increment to begin the vapor phase thermal transfer. Such devises are self-regulating, so that within the limits of their transport capacity, the devise performance will automatically tend to match the thermal load. An additional advantage is that such devises do not require electrical energy to operate and thus may be used even though isolated from an electrical power source.

In known systems the working fluid circulates in an uninterrupted cycle. Such systems are characterized by the use of a single condenser chamber and, except for the circulation of the working fluid, do not have moving parts.

Under these circumstances, there is an increasing demand for a mechanism that will operate without active system controls and that retains advantages of the prior art, such as self-starting, self-regulating features. In addition, there is a demand for a devise that will transfer thermal energy in opposition to gravitational forces, that does not require the use of electricity, and that will transport thermal energy with great reliability.

OBJECTS OF THE INVENTION

The present invention has been achieved in compliance with the above described demand.

It is an object of the present invention to provide a mechanism that will operate without active system controls and that retains advantages of the prior art, such as self-starting, self-regulating features.

Another object of the invention is to provide a mechanism that will not reverse-cycle. Said otherwise, a mechanism that halts its operation when the temperature of the heat-source falls below that of the heat-sink, so as not to operate to transfer thermal energy from the condenser to the evaporator at any time, regardless of their respective temperatures.

Another object of the invention is to provide a mechanism that can move working fluid liquid uphill against the force of gravity; said otherwise, in a gravity environment, provide a mechanism that can transfer thermal energy in a downward direction.

Another object of the invention is to provide a mechanism that will operate in a zero-gravity or a microgravity environment.

Another object of the invention is to provide a mechanism that can transfer thermal energy over a greater distance than has been accomplished with known devises.

Another object of the present invention to provide a mechanism that uses thermal energy exclusively to provide the motive power whereby the invention operates; in that the mechanism can convert a portion of the thermal energy so transferred into internal mechanical energy in order for the mechanism's operation to remain independent of any type of external energy, other than thermal energy.

Another object of the invention is to provide a mechanism that allows flexibility in the relative placement of the evaporator and condenser.

Another object of the invention is to provide a mechanism that uses a thermally created internal pressure differential to return the condensate to the evaporator.

Another object of the invention is to provide a mechanism wherein the limit to the distance over which the thermal transfer is effected and the rate of thermal transfer are primarily dependent on the temperature differential between the heat-source and heat-sink.

Further objects and the features of novelty which characterize the invention will become apparent from the following description of embodiments in conjunction with the accompanying drawings.

SUMMARY OF THE INVENTION

The present invention is a thermal transport devise essentially comprising hermetically sealed container with chambers and passageways, internal mechanical members, and internally circulating liquid-vapor phase changing working fluid. The invention acts to transport thermal energy from a hot zone to a cold zone.

The invention is unique when compared to prior art in that it has moving mechanical parts and two condenser chambers; it generates a predetermined internal pressure difference between the two chambers; and it uses this pressure differential to return condensate to the evaporator.

BRIEF DESCRIPTION OF THE DRAWINGS

The nature of the invention will be more readily understood from the description of the operation of the invention and illustrations of embodiment as applied to the mechanism described, given by way of example only, and with reference to the accompanying drawings wherein.

Figure 1:
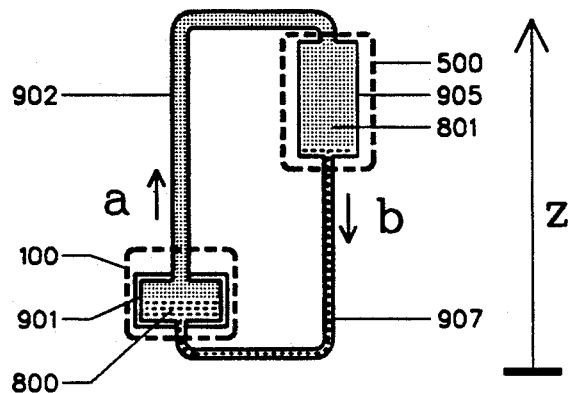
FIG. 1 depicts a schematic diagram of a known thermosyphon system.
Figure 2:
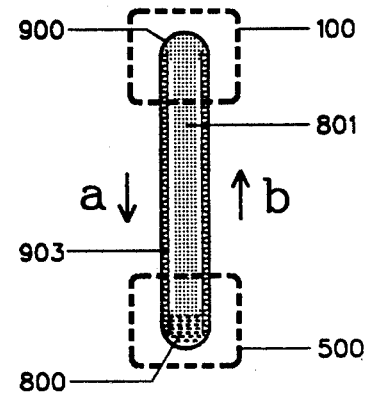
FIG. 2 depicts a schematic diagram of a known heat pipe system.

DESCRIPTION OF KNOWN ART—FIGS. 1 and 2

Before discussing embodiments of the present invention, an explanation will be made hereinunder as to known prior art, in order to clarify the drawbacks of the conventional thermal transport systems and hence, the technical object to be achieved by the present invention.

Referring to FIG. 1; a thermal energy transfer system of known art that uses gravity to return the liquid working fluid to the evaporator, a thermosyphon, is illustrated diagrammatically. The gravitational phenomenon is indicated by arrow z; where the solid bar indicates the low point and the arrow points in the direction of increasing height.

The known system comprises an evaporator 901, a vapor passageway 902, a condenser 905, and a liquid passageway 907, all being made of a metal material, joined at their boundaries in such a way as to make a hermetically sealed container. Circulating inside this container is a phase-changing fluid, both a working fluid liquid 800, and a working fluid vapor 801. During system operation the working fluid vapor moves in the direction indicated by arrow a and the working fluid liquid moves in the direction indicated by arrow b.

There is shown a heat-source 100 which is an environment that possesses thermal energy at a higher temperature than the temperature of a heat-sink 500. As the working fluid accepts this thermal energy, it vaporizes. As discussed above, the evaporation and condensation action causes the vapor mass to move, from the evaporator against the opposing force of gravity, to the condenser. As the vapor rejects thermal energy, it condenses; the liquid mass then runs downhill to the evaporator, completing the cycle.

Two constrains imposed on the thermal syphon are that it cannot be used to transfer thermal energy in opposition to gravitational forces, nor will it operate in the absence of a gravitational field.

Referring to FIG. 2; a thermal energy transfer system of known art that uses capillary action to return the liquid working fluid to the evaporator, a heat pipe, is illustrated diagrammatically. To a limited extent, the heat pipe can transfer thermal energy in opposition to gravitational forces.

The known system comprises a tubular container 900, a capillary wicking material 903, working fluid liquid 800 and working fluid vapor 801. Tubular container 900 is hermetically sealed. Capillary wicking material 903 is tubular in distribution, permanently positioned adjacent to the inside wall circumference and running the length of container 900. Circulating inside container 900 are both working fluid liquid 800 and working fluid vapor 801. During system operation the vapor moves in the open space in the direction indicated by arrow a and the liquid moves in the capillary wicking material in the direction indicated by arrow b. Such a heat pipe as shown will operate in a reverse mode as a thermosyphon if the temperature of the condenser region exceeds that of the evaporator region.

FIG. 2 shows heat-source 100 and heat-sink 500. The heat pipe acts as a thermal bridge between the two regions. As the working fluid accepts thermal energy, it vaporizes and the vapor mass moves from the evaporator end to the condenser end of container 900. Thermal energy is transported by the vapor molecules and and is thus transferred from heat-source 100 to heat-sink 500. As the vapor rejects thermal energy, it condenses and capillary action moves the liquid back to the evaporator, keeping the region saturated with liquid and completing the cycle.

Since the heat pipe relies on capillary action it cannot be used to transfer thermal energy a further distance than the capillary action works. Due to of the nature of the capillary operation, the evaporator and condenser regions of heat pipes are required to be in fairly close proximity. Perhaps more importantly, the rate of thermal transfer is limited by the rate that capillary wicking material 903 can provide working fluid liquid 800 to the evaporator end of container 900.

DESCRIPTION OF DRAWING FIGS. 3, 4, 5, 10, 11, and 12

Figure 3:
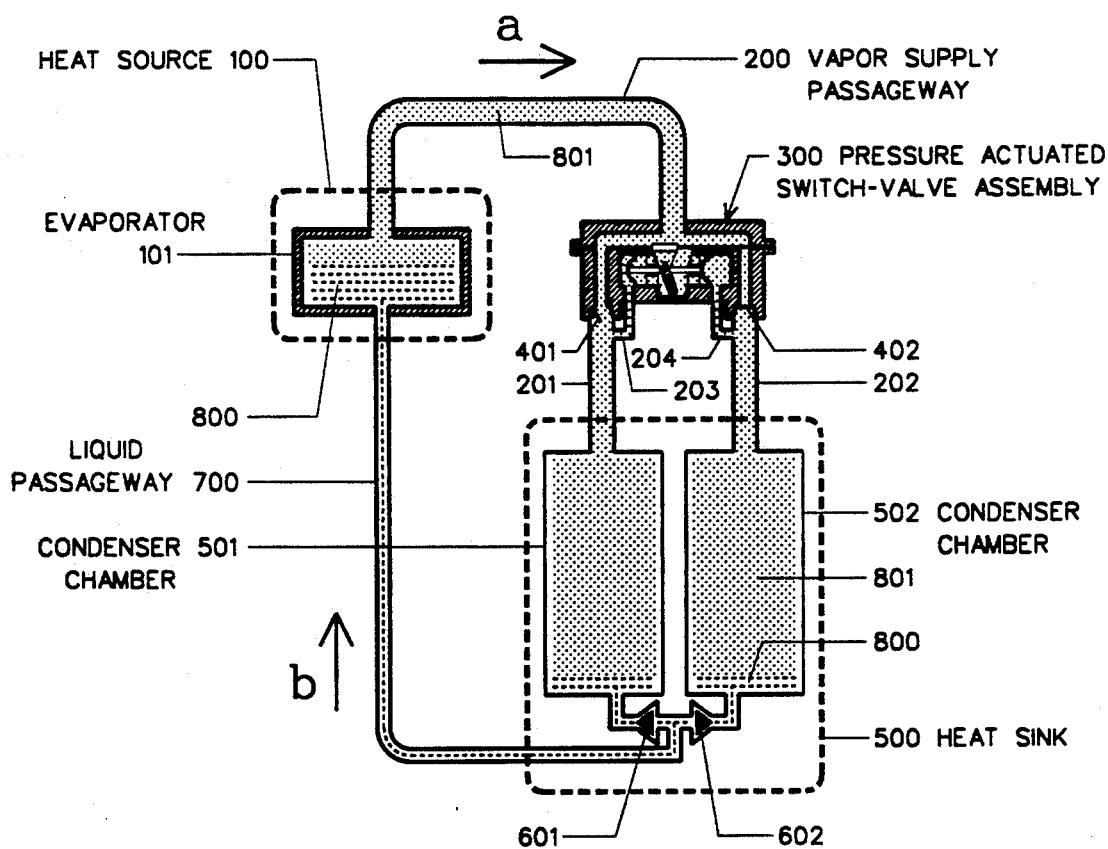
FIG. 3 depicts a schematic diagram of one system arrangement in accordance with the invention.

Referring to FIG. 3 which diagrammatically illustrates one thermal energy transport system arranged in accordance with the invention.

In accordance with the invention there is provided a thermal transport system, comprising an evaporator 101, a vapor supply passageway 200, a switch-valve assembly 300, two vapor check-valves 401, 402, two vapor passageways 201, 202, two vapor pressure tubes 203, 204, two condenser chambers 501, 502, two liquid check-valves 601, 602, and a liquid passageway 700, joined together so as to form a hermetically sealed container. Inside the devise, a working fluid vapor 801 moves in direction indicated by arrow a and a working fluid liquid 800 moves in direction indicated by arrow b. In this invention, the system forms a thermal bridge between a heat-source 100 and a heat-sink 500.

All members of the invention are made from material of known composition that is commercially available. All members of the exterior shell are made from material that is able to maintain its structural integrity when subjected to the external temperatures of the heat-source and heat-sink, and the internal pressures generated by the working fluid during devise operation. In the preferred embodiment the exterior shell of the system is made of metallic material, such as steel, copper, brass, or aluminum. Depending on the operational temperatures and pressures, other materials, such as resin fiber composites as well as certain plastic materials are suitable for use.

All members of the invention's exterior shell are fixedly joined at their peripheries making a hermetically sealed container with interconnected chambers and passageways. In the preferred embodiment the joining of such member is accomplished by means of a welded or brazed connection; however there are many known methods of making sealed connections that are suitable for use.

Shown is heat-source 100 and evaporator chamber 101 within, containing both working fluid liquid 800 and working fluid vapor 801. The evaporator's internal configuration is such that the primary surfaces which conduct thermal energy to the working fluid are covered with liquid. The evaporator chamber has two openings; one opening to vapor supply passageway 200 which allows vapor to exit the chamber, and one opening to liquid passageway 700 which allows liquid to enter the chamber.

Working fluid 800, 801 accepts thermal energy and vaporizes at the temperature and pressure of the evaporator chamber, and rejects thermal energy and condenses at the temperature and pressure of the condenser chambers. Suitable working fluid include ones that will change state between liquid and vapor at a temperature within the desired operating temperature range, also, that are non-corrosive to the system's internal materials and surfaces. Suitable fluids include water, ammonia, acetone, alcohol, and Freon.

In the preferred embodiment the working fluid liquid 800 and vapor 801 is Dichlorotetrafluoroethane, also known as refrigerant R-114, available from E. I. duPont de Nemours & Company of Wilmington, Del. There are other commercially available formulations that are suitable for use.

Vapor supply passageway 200 is a tubular element with a crossectional area sufficient to allow the vapor to pass through it freely. It is configured so as to minimize the amount of liquid that moves through the passageway. The vapor is channeled from supply passageway 200 into pressure actuated switch-valve assembly 300. The pressure actuated switch-valve assembly is described in further detail in the discussion of FIGS. 4 and 5.

FIG. 3 shows switch-valve assembly 300 connected to vapor check-valves 401, 402. The vapor check-valve is a one-way valve which allows free passage of vapor in one direction but prevents vapor passage in the reverse direction. The check-valve can be any suitable reed or poppet type valve. Another valve can be used, provided the valve can open and close repeatably, and it allows vapor to flow easily in one direction and makes a positive seal against vapor flow in the reverse direction.

Sequentially in the direction of vapor flow, check-valves 401, 402 are connected to corresponding vapor passageways 201, 202. Vapor passageways 201 and 202 are tubular elements with identical length and cross sectional area. The cross sectional area of either passageway 201 or 202 is equal to or greater than the cross sectional area of supply passageway 200. Interconnecting the switch-valve assembly and passageways 201 and 202, are pressure tubes 203 and 204, respectively. Tubes 203, 204 provide a duct through which the vapor pressures in passageway 201 and 202 are transmitted to switch-valve assembly 300.

Vapor passageways 201, 202 are joined to corresponding condenser chambers 501 and 502, respectively. The chambers are identical and symmetrical. The chambers' internal configuration provides a large surface area and maintains through passage for the working fluid. In a preferred embodiment the chambers comprise a plurality of parallel tubes or flat plate passageways arranged so that the condensate will tend to collect at the far end of the chamber.

Condenser chambers 501, 502 are located in the heat-sink 500, that is to say, the environment with a lower temperature than heat-source 100. Chambers 501, 502 are connected to corresponding liquid check-valves 501 and 602, respectively. The liquid check-valve is a valve which allows free passage of liquid in one direction but prevents liquid passage in the reverse direction. In the preferred embodiment the check-valve is a Magna-Check Valve available from Watsco, Incorporated, of Hialeah, Fla. Another valve can be used, provided the valve can open and close repeatably, and it allows liquid to flow easily in one direction and makes a positive seal against liquid flow in the reverse direction.

Check-valves 601, 602 are connected to liquid passageway 700 which is a tubular member joined to evaporator 101. Passageway 700 has a cross sectional area sufficient to allow the liquid to flow freely from either condenser chamber to the evaporator chamber.

Figure 4:
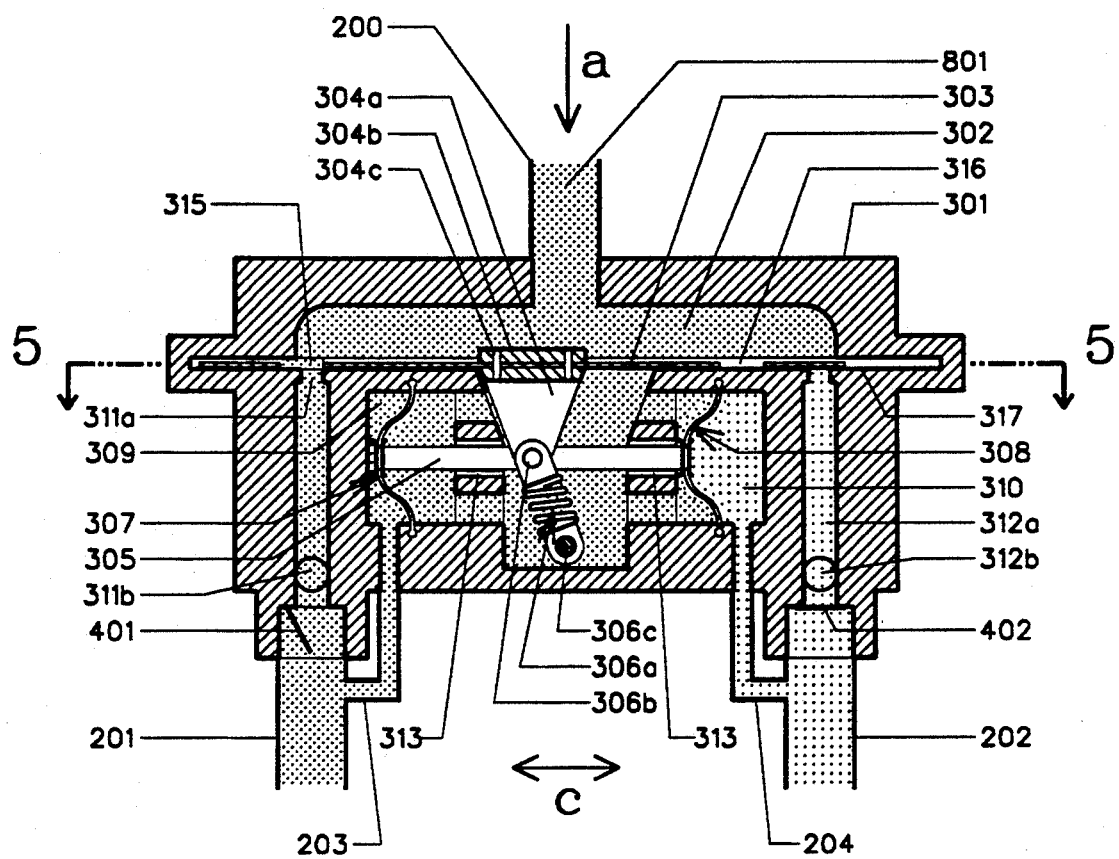
FIGS. 4 and 5 depict related sectional views of one arrangement of a pressure actuated switch-valve assembly in accordance with the invention.
Figure 5:
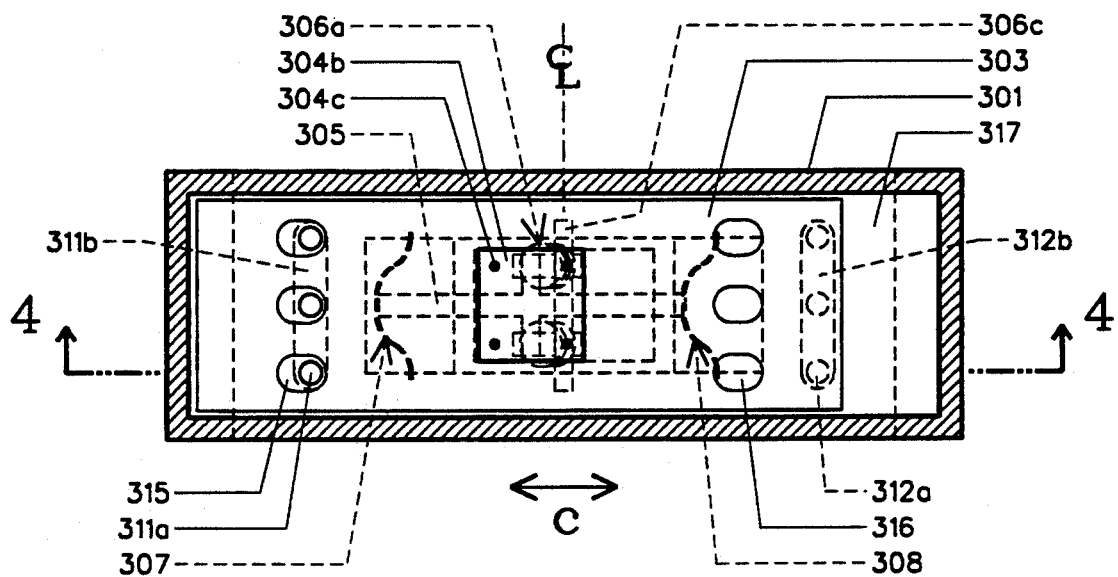

FIGS. 4 and 5 illustrate related sectional views of the pressure actuated switch-valve assembly 300 shown in FIG. 3, arranged in accordance with the invention. FIG. 4 has section marks 5—5 indicating the view shown in FIG. 5, and FIG. 5 has section marks 4—4 indicating the view shown in FIG. 4.

Referring to FIG. 4, vapor supply passageway 200 is connected to a switch-valve body 301. Working fluid vapor 801 enters the valve body 301 through supply passageway 200 in the direction indicated by arrow a and flows into a vapor chamber 302. Chamber 302 has a flat surface 317, finish-machined so as to form a smooth plane surface, in which are located two sets of circular ports 311a and 312a, each set having a plurality of apertures. Ports 311a open into and become one volume with a manifold chamber 311b; likewise, ports 312a open into and become one volume with a manifold chamber 312b.

Chamber 311b has an outlet into a vapor check-valve 401; likewise chamber 312b has an outlet into a vapor check-valve 402. After flowing through the check-valve, vapor 801 enters vapor passageway 201, or 202, and from there flows into a condenser chamber as shown in FIG. 3.

As shown in FIG. 4, a sliding-valve 303 rides on surface 317 and slides back and forth between two stable positions, each position being at an extreme of the motion, in directions indicated by an arrow c. In the preferred embodiment sliding-valve 303 is made from a 0.020 inch thick smooth sheet of Teflon; Teflon is a trademark of E. I. duPont de Nemours & Company, of Wilmington, Del. Other material that is compatible with the working fluid, that slides easily on surface 335, and makes a positive vapor seal in the forward direction when it covers the port openings, can be used.

Sliding-valve 303 has two sets of openings 315 and 316, arranged symmetrically with respect to the center of the valve, with each set having a plurality of openings corresponding to the port holes. Openings 315, 316 are of such shape and are so arranged as to make chamber 302 open to port 311a and closed to port 312a when sliding-valve 303 is in one position, and vise versa, closed to port 311a and open to port 312a when the valve is in its opposite position.

As shown best in FIG. 5, each set of ports 311a, 312a and each set of openings 315, 316 are three in number. The number of ports and openings does not determine the operation of the devise; the number of ports and openings is important in that the aggregate area one set of port apertures is equal to or greater than the cross sectional area of supply passageway 200.

As shown in FIG. 4, sliding-valve 303 is clamped between a valve carriage 304a and a cap plate 304b, using fasteners 304c, and are all made from a metallic material such as stainless steel. Valve 303 is attached to the carriage and moves in conjunction with the carriage. Carriage 304a moves back and forth in directions indicated by arrow c and its movement is limited by parts of body 301. Thus the motion of carriage 304a and all attached members are stopped in two places, each being an extreme of the motion.

Carriage 304a is attached to a connecting rod 305 at the midpoint of the rod using a pin 306b. Pin 306b is made from a metal such as stainless steel, and is held in place by fasteners in the carriage. Connecting rod 305 is a round rod made from a durable metal such as stainless steel, machined so as to form a smooth, sliding surface along its length. The connecting rod is supported by and is held in firm alignment by two bushings 313, made from a resilient metal such as phosphor bronze, which are held fixedly in place by body 301. Connecting rod 305 slides back-and-forth in bushings 313 with the same oscillating movement as carriage 304a.

One end of a resisting compression spring assembly 306a is also attached to the midpoint of connecting rod 305 by pin 306b. Spring assembly 306a comprises compression springs and retaining end caps, mounted between pin 306b and a pivot post 306c. Compression springs are available from Precision Coil Spring Company of El Monte, Calif., and are sized according to the desired resistance to movement. The retaining end caps are made from a resilient metal such as phosphor bronze and they serve to mount and hold the spring in place. Pivot post 306c is made from a rigid metal such as hardened steel.

Each end of pivot post 306c is fixedly connected to body 301 at the centerline of the body. The spring assembly is under slight compression when rod 305 and carriage 304a are at one or the other extreme position; it is compressed further as the rod and carriage move between the extreme positions. Spring assembly 306a provides a determinable resistance to movement of the connecting rod. Because of the geometric relationship between the connecting rod, spring assembly and pivot post, the spring offers its maximum resistance to movement at the stable extreme positions.

Each end of connecting rod 305 is attached to the center of diaphragm assemblies 307 and 308 using suitable fasteners. Diaphragms 307, 308 are circular flexible members, made from a material such as a fiber reinforced elastomeric, or a thin sheet of metal such as stainless steel or copper. A diaphragm can be single layer or folded construction; a bellows type member can be used; alternately a rigid piston with o-ring seals can be used. Sliding valve 303, connecting rod 305, diaphragms 307 and 308, and spring assembly 306a, act in unison and their oscillating movement is symmetrical with respect to the centerline of the switch valve body 301.

Diaphragms 307, 308 are are fixedly joined at their periphery to switch-valve body 301, forming cylindrical pressure chambers 309 and 310, respectively. The diaphragms seal chambers 309 and 310 from chamber 302 and react to pressure differences between chambers 309 and 302, or chambers 310 and 302.

Pressure chamber 309 is connected to condenser vapor passageway 201 via a pressure tube 203; likewise pressure chamber 310 is connected to condenser vapor passageway 201 via a pressure tube 204. This allows the vapor pressure in the pressure chambers to closely match that of their respective passageway and condenser chamber.

Referring to FIG. 5, which shows a sectional view through switch-valve body 301, looking down on sliding-valve 303 and flat surface 317.

Flat surface 317 is rigidly fixed with respect to switch-valve body 301 and has two sets of circular ports 311a and 312a arranged equal distance from the centerline $C_L$ of body 301.

Sliding-valve 303 rides on top of surface 317 and slides back and forth in directions indicated by arrow c. Valve 303 has two sets of openings, arranged symmetrically with respect to the center of the valve, and corresponding to ports 311a and 312a in surface 317.

As shown, each set consists of three openings and three ports; obviously a greater or lesser number of ports and openings could be used in each set. The shape and arrangement of ports and openings could vary from that shown while still maintaining functionality.

As shown sliding-valve 303 is in one extreme position where openings 315 are open to ports 311a and ports 312a are covered by a solid portion of the valve; conversely, when sliding-valve 303 is in the other extreme position openings 316 are open to ports 312a and ports 311a are covered.

Sliding valve is clamped between valve carriage 304a and cap plate 304b, using fasteners 304c and thereby fixedly attached to connecting rod 305 and diaphragm assemblies 307 and 308. The movement of rod 305 is resisted by the action of spring assembly 306a pivoting about post 306c as described in FIG. 4 discussion above.

Figure 10:
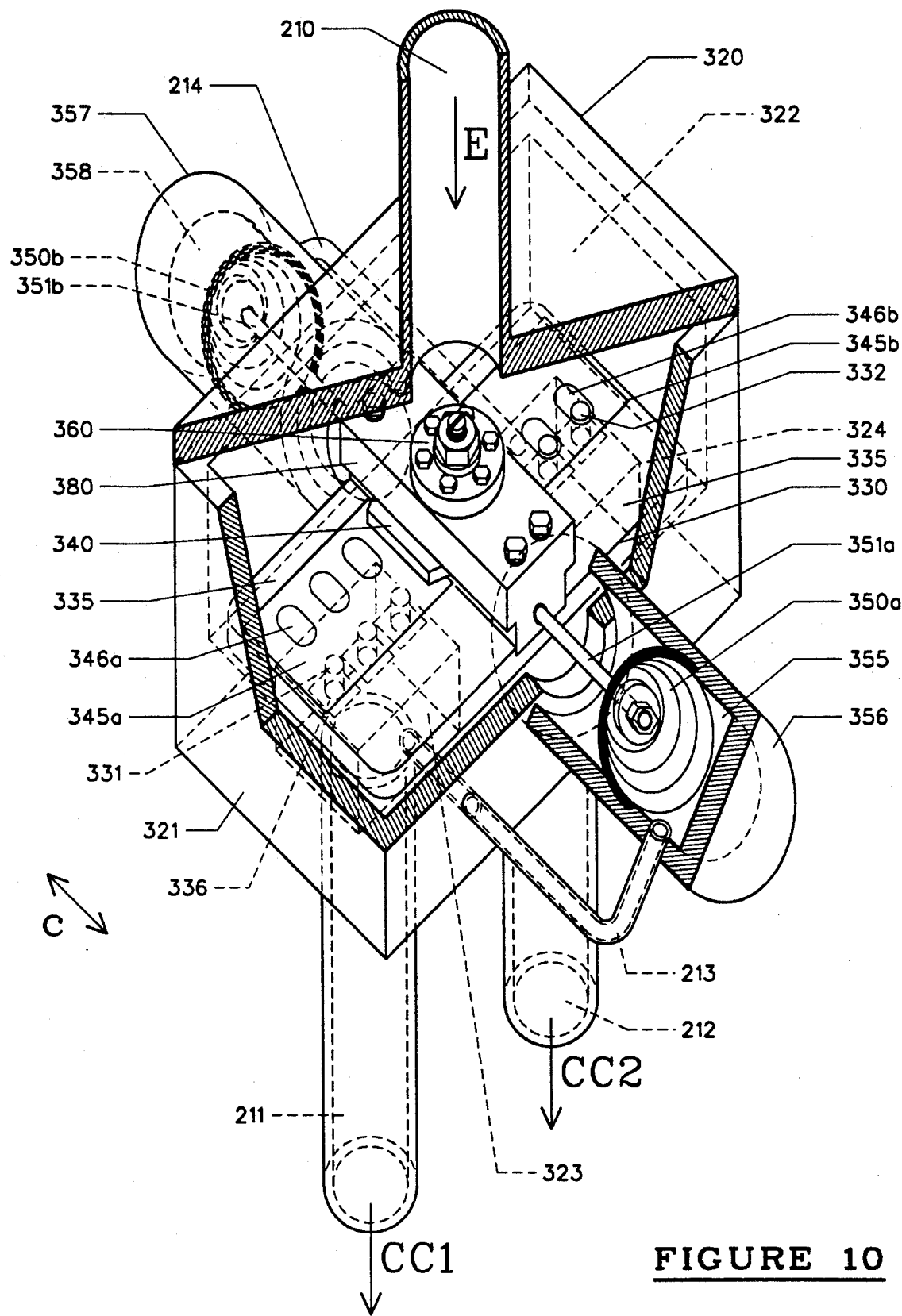
FIG. 10 depicts an isometric view of the preferred embodiment of a switch-valve assembly in accordance with the invention.
Figure 11:
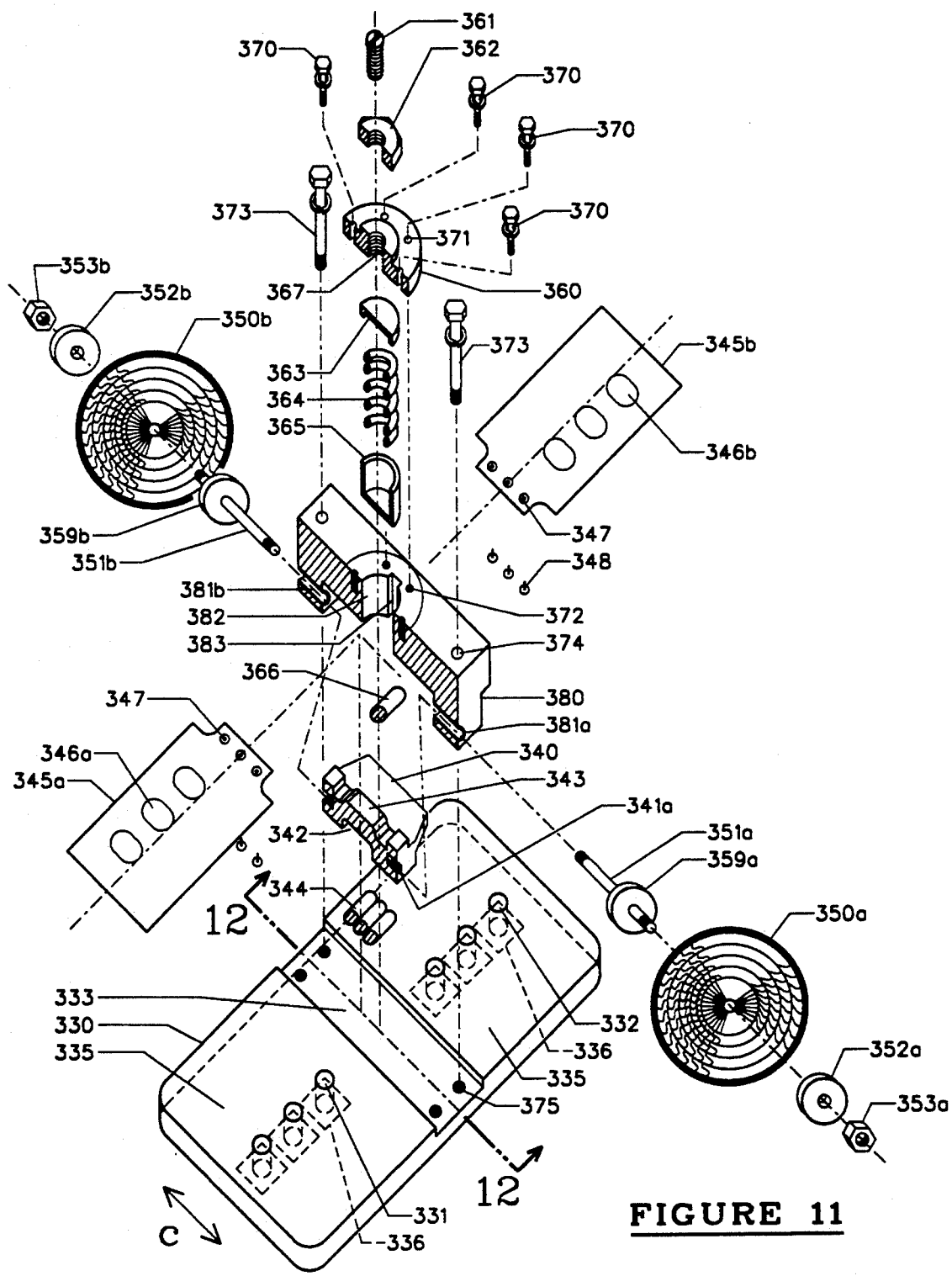
FIG. 11 depicts an isometric view of the preferred embodiment of a spring and valve assembly in accordance with the invention.
Figure 12:
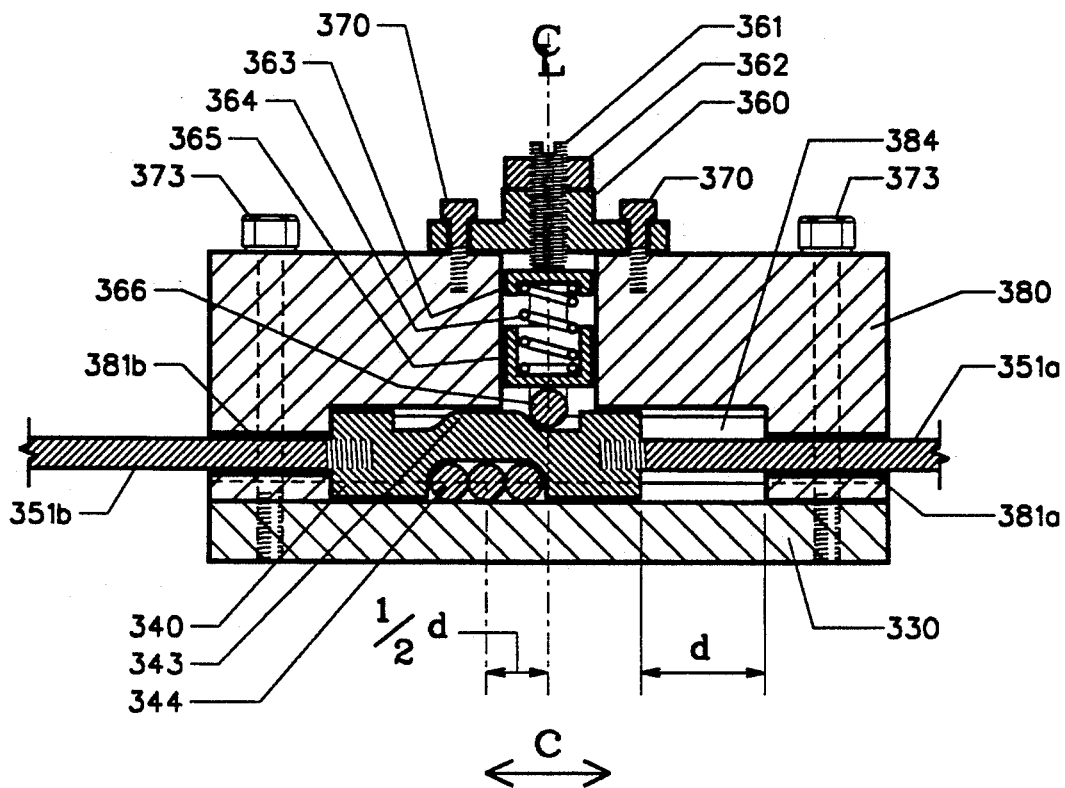
FIGS. 12 and 13 depict sectional views of the preferred embodiment of a spring assembly in accordance with the invention.
Figure 13:
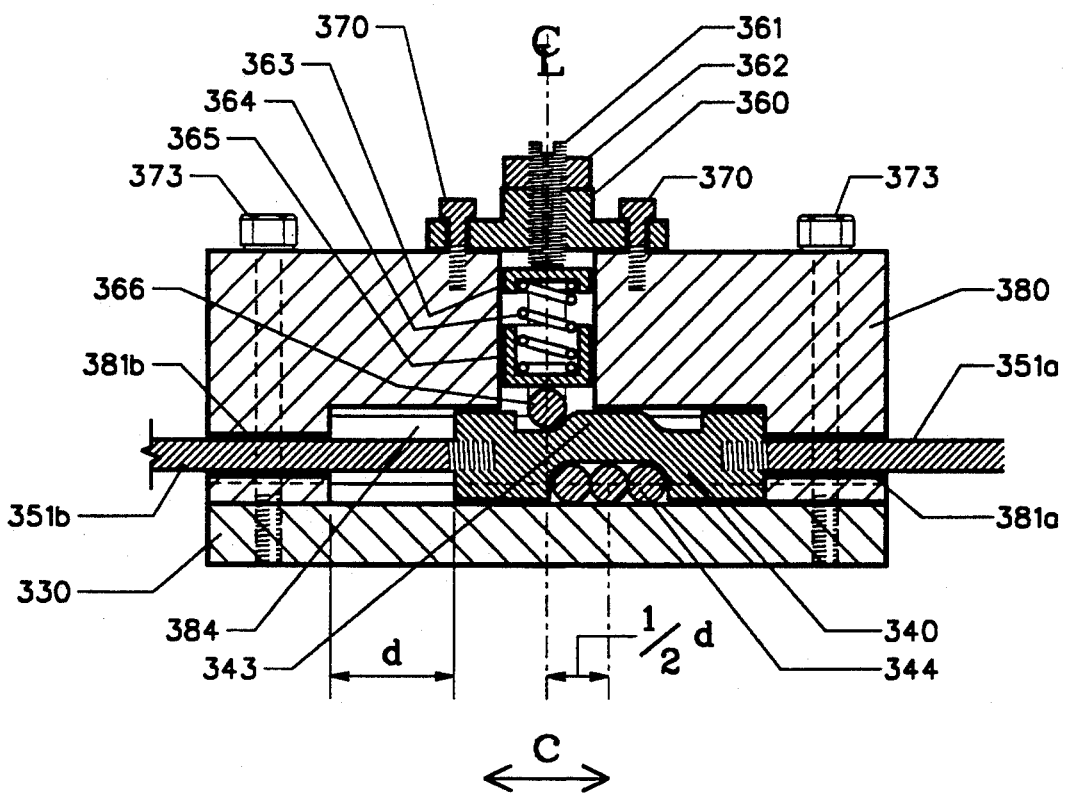

FIGS. 10, 11, 12, and 13 illustrate related views of the preferred embodiment of a switch-valve assembly comprising body members, valve assembly and spring assembly in accordance with the invention. FIG. 10 shows an isometric view of the exterior of a switch-valve assembly with cut away portions revealing the mechanical workings inside. FIG. 11 illustrates an exploded isometric view of the mechanical workings depicted in FIG. 10, without the exterior shell or body. FIGS. 12 and 13 illustrate a sectional view of the spring assembly shown in FIG. 11 and indicated by section marks 12—12 thereon.

Referring to FIG. 10, which shows a vapor supply passageway 210, joined to a valve body cap 320 which is joined to a switch-valve body 321. Body 321 is also joined to two condenser vapor passageways 211 and 212 and two pressure chamber bodies 356 and 357. A vapor pressure tube 213 interconnects a pressure chamber 355 with a manifold chamber 323 located inside of body 321; similarly a vapor pressure tube 214 interconnects an opposing pressure chamber 358 with a manifold chamber 324.

All members of the exterior body are made from material that is able to maintain its structural integrity when subjected to the external temperatures of the heat-source and heat-sink, and the internal pressures generated by the working fluid during devise operation. In the preferred embodiment bodies 321, 356, and 357, cap 320, passageways 210, 211, and 212, and tubes 213 and 214 are made of metallic material, such as steel, copper, brass, or aluminum. Depending on the operational temperatures and pressures encountered in various applications, other materials, such as resin fiber composites as well as certain plastic materials, are suitable for use.

Referring to FIG. 11, which shows a valve plate 330 made from a rigid and hard metallic material such as stainless steel. Top surface 335 and the bottom surface of plate 330 are machine ground to provide flat surfaces with a 32 micron finish. Plate 330 has two sets of circular ports 331 and 332, each set consisting of three apertures which extend through plate 330. Check-valve 336, a common reed valve made from a flat piece of thin flexible material such as spring steel with a precision ground finish, is attached to the bottom surface of plate 330 at the base of each port by means of screws or other fasteners. As best shown in FIG. 10 check-valve 336 is attached so that it will flex away from the bottom surface of plate 330 and allow the passage of vapor when the vapor pressure on the port side exceeds the vapor pressure in chamber 323 or 324. The check-valve will make a positive seal against vapor flow if these pressures are reversed. Check-valve 336 can be any suitable reed or poppet type valve.

FIG. 11 shows a channel 333 cut into plate 330, parallel to top surface 335 with sides that are perpendicular to the same top surface. Within the area of channel 333 are four holes 375, threaded to receive bolts 373.

Channel 333 makes a track for roller bearings 344 upon which rides valve carriage 340, all made from a rigid and hard metallic material such as stainless steel. Carriage 340 and bearings 344 move back and forth in directions indicated by arrow c. Carriage 340 has two holes 352a and 352b, threaded to receive connecting rods 351a and 351b. Rods 351a and 352b are fabricated with integral diaphragm piston 359a and 359b, and have attached diaphragms 350a and 350b, retaining caps 352a and 352b, and nuts 353a and 353b, respectively. Rods 351a, 351b, pistons 359a, 359b, caps 352a, 352b, and nuts 353a, 353b, are made from a metallic material such as aluminum or stainless steel.

In the preferred embodiment, diaphragms 350a, 350b are rolling diaphragms made from Dacron fabric coated with Fluorocarbon Polymer elastomer, available from Bellofram Corporation of Pelham, N.H. There are other companies that manufacture equally suitable diaphragms. The diaphragm assembly, comprising piston, diaphragm, and retaining cap, must be fabricated according to the manufacturer's recommendations.

Riding on surface 335 are sliding-valves 345a, 345b and attached to carriage 340 by means of pins 348 through holes 347 and into corresponding holes in the carriage. In the preferred embodiment sliding-valves 341, 342 are made from a 0.020 inch thick smooth sheet of Teflon; Teflon is a trademark of E. I. duPont de Nemours & Company, of Wilmington, Del. Material that is compatible with the working fluid, slides easily on surface 335, and makes a positive vapor seal in the forward direction when it covers the port openings can be used. Sliding-valves 345a, 345b are fashioned symmetrically with openings 347a, 346b offset to opposite sides of the line of symmetry, so that when carriage 340 is in one extreme position, one set of ports 331 or 332 will be open and the other covered, and the opposite set of ports open or covered when the carriage is in the other extreme position.

As shown in FIGS. 12 and 13, a spring housing 380, made of a metallic material such as stainless steel, is attached to valve plate 330 and held fixedly in place by means of bolts 373. Housing 380 has two bushings 381a, 381b made from a resilient metal such as phosphor bronze which are held fixedly in place by housing 380. Connecting rods 351a, 351b slide in bushings 381a, 381b and the bushings align valve carriage 340 and restrict the movement of the carriage to axial movement in directions indicated by arrow c. Housing 380 has a cylindrical hole 382, placed perpendicular to the axis of motion of carriage 340, in which a piston 365 slides up and down, riding on a cam roller 366, which in turn engages a carriage cam 343. The end of cam roller 366 is restrained by a slot 383, best shown in FIG. 11, so that its displacement is restricted to the up and down movement of piston 365.

As shown in FIGS. 12 and 13, piston 365 is pressed against cam roller 366 and carriage cam 343 by a compression spring 364. Spring 364 is contained in housing 380 by a spring cap 360 which is attached to the housing by bolts 370, through holes 371 and into threaded holes 372. Spring cap 360 has a threaded hole which accepts an adjustment screw 361. Screw 361 is locked in place by a lock nut 362. Screw 361 can be turned to increase pressure on a spring retainer 363, which gives the appropriate compression to spring 364.

Bearings 344, cam roller 366, piston 365, spring retainer 363, spring cap 360, screw 361, lock nut 362, bolts 370, and bolts 373 are made from a metallic material such as stainless steel.

OPERATION OF THE INVENTION—FIGS. 3 to 14

Referring to FIG. 3 which illustrates diagrammatically one thermal energy transfer system arranged in accordance with the invention.

There is shown heat-source 100 wherein is evaporator 101 containing working fluid liquid 800. The mechanism accepts heat into the working fluid at the evaporator the which causes liquid 800 to change state into vapor 801. The vapor migrates through supply passageway 200 in the direction indicated by arrow a, and into pressure actuated switch-valve assembly 300.

The switch-valve assembly is a two-position valve that can direct the vapor, alternately, through either one or the other of two vapor check-valves 401, 402, through corresponding condenser vapor passageway 201, 202, and into corresponding condenser chamber 501, 502.

The condenser chambers reject heat to surrounding heat-sink 500. The rejection of heat causes the working fluid vapor to condense into liquid. The liquid is pumped through liquid check-valve 601, 602, through liquid passageway 700 in the direction indicated by arrow b, and back into evaporator 101.

FIGS. 4 and 5 illustrate related sectional views of the pressure actuated switch-valve assembly 300 shown in FIG. 3, arranged in accordance with the invention. FIG. 4 has section marks 5—5 indicating the view shown in FIG. 5, and FIG. 5 has section marks 4—4 indicating the view shown in FIG. 4.

Referring to FIG. 4 which shows vapor supply passageway 200 connected to switch-valve body 301 whereby working fluid vapor 801 enters a vapor chamber 302 which has a smooth, flat surface 317. A sliding-valve 303 rides on top of surface 317 and slides back and forth in directions indicated by arrow c.

As best shown in FIG. 5, surface 317 has two sets of ports 311a, 312a, located symmetrically and equal distance from centerline $C_L$ of body 301. Sliding-valve 303 has two sets of oblong openings 315, 316, which are functionally related to ports 311a and 312a, respectively, in that they serve to open or close these ports to chamber 302. Openings 315 and 316 have a long dimension of one-half of the travel distance of sliding-valve 303 while the apertures of ports 311a and 312a have a diameter of one-forth of this travel distance. Valve openings 315 and 316 are placed symmetrically about the center of valve 303 and separated by such a distance that only one set of port apertures, 311a or 312a, will be exposed at any time. The ports and openings are arranged so that one set of port apertures will be open until sliding-valve 303 reaches the midpoint of its travel, whereupon, that set will be covered and the other set open. When the ports are covered by valve 303, no vapor can pass through; conversely, when openings are above the port apertures, vapor can pass freely.

As shown in FIG. 4, sliding-valve 303 is clamped between valve carriage 304a and cap plate 304b, which is attached to connecting rod 305. Circular diaphragms 307 and 308 are attached to the ends of rod 305. Connecting rod 305 slides back and forth in two bushings 313 in directions indicated by arrow c and thereby the motion of sliding-valve 303 is restricted to axial movement coinciding with the centerline of rod 305. One end of spring assembly 306a is attached to rod 305 using pin 306b and this end moves back an forth with the rod. The other end of spring assembly 306a pivots about post 306c, the post being rigidly fixed in switch-valve body 301. The normal arc of travel of the pinned end of spring 306a is intersected by the restricted straight axial movement of connecting rod 305; thus the spring is compressed during its travel and provides resistance to the movement of rod 305. The collision of carriage 304a with parts of switch body 301 determines the extent of the movement and in combination with the spring action, provides two stable positions for sliding-valve 303, carriage 304a, rod 305, and spring assembly 306a. Further, the force vector resisting movement is greatest when spring assembly 306a is in one or the other stable position.

The spring assembly geometry shown in FIG. 4 is one possible arrangement; other arrangements can be used as well. The operation of the invention is dependent on the action of the spring assembly in three respects. First, that the assembly provides exactly two stable positions at the extremes of its movement. Second, the resistance to movement from one stable position is commensurate with the resistance to movement from the other position. Third, that the resistance to movement is greatest while the assembly is in one or the other the stable position and negligible when the assembly is at the midpoint of its travel.

Ports 311a are interconnected by manifold chamber 311b which opens into vapor check-valve 401, which opens into condenser passageway 201. Passageway 201 is the inlet for condenser chamber 501 shown in FIG. 3. FIG. 4 shows vapor pressure tube 203 interconnecting pressure chamber 309 and passageway 201. Pressure tube 203 allows the vapor pressure in passageway 201 to be transmitted to chamber 309 and thus act on diaphragm 307.

Ports 312a are interconnected by manifold chamber 312b which opens into vapor check-valve 402, which opens into condenser passageway 202. Passageway 202 is the inlet for condenser chamber 502 shown in FIG. 3. FIG. 4 shows vapor pressure tube 204 interconnecting pressure chamber 310 and passageway 202. Pressure tube 204 allows the vapor pressure in passageway 202 to be transmitted to chamber 310 and thus act on diaphragm 308.

As shown, vapor 801 is directed from switch-valve chamber 302 through port 311a, through a vapor check-valve 401 and into a condenser vapor passageway 201. When the sliding-valve is in the other stable position, vapor 801 is directed from switch-valve chamber 302 through port 312a, through a vapor check-valve 402 and into a condenser vapor passageway 202. As described in the discussion of FIG. 3, the vapor pressure in condenser chamber 501 and passageway 201 will increase and the vapor pressure in condenser chamber 502 and passageway 202 will decrease; thus a pressure differential is created. As shown in FIG. 4, this differential pressure is transmitted through tubes 203, 204 into chambers 309, 310 where it acts on diaphragms 307 and 308, respectively, to generate a force in rod 305 that acts against the resisting spring assembly 306a. When the differential pressure force on one diaphragm is greater than the opposing spring force, sliding-valve 303, carriage 304a, rod 305, and spring assembly 306a move to the alternate stable position, in this case, opening port 312a and closing port 311a to vapor chamber 302.

FIGS. 6, 7, 8, and 9 illustrate four diagrams of the cyclic operation of one system arrangement in accordance with the invention. There is shown in each diagram heat-source 100 and heat-sink 500, with the system comprising evaporator 101, evaporator vapor supply passageway 200, pressure actuated switch-valve assembly 300, sliding-valve 319, vapor check-valves 401, 402, condenser vapor passageways 201, 202, symmetrical condenser chambers 501, 502, liquid check-valves 601, 602, and liquid passageway 700. The system exterior forms a hermetically sealed container within which circulates working fluid liquid 800 and working fluid vapor 802, 803, and 804.

Figure 6:
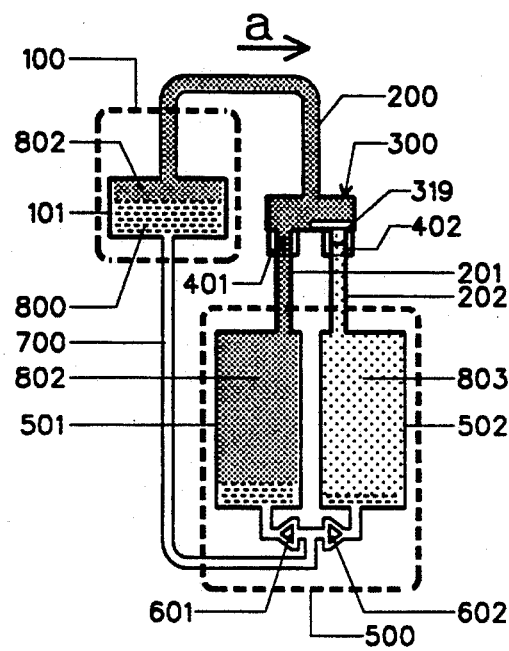
FIGS. 6, 7, 8, and 9 depict related schematic diagrams of the system operation showing the pressure cycle of one condenser chamber, the pumping cycle of that chamber, the pressure cycle of the other chamber, and the pumping cycle of that chamber, respectively, in accordance with the invention.

As shown in FIG. 6, evaporator 101 contains working fluid liquid 800 which is changed into vapor 802 by virtue of thermal energy accepted into the system from heat-source 100. The vapor moves through supply passageway 200 in the direction indicated by arrow a into the switch-valve assembly 300, through vapor check-valve 401, and into condenser chamber 501. When sliding-valve 319 is in the position indicated, condenser chamber 502 is isolated from the remainder of the system so that the vapor pressure in evaporator 101 can not effect the vapor pressure in condenser 502. Further, check-valve 602 prevents the vapor pressure in evaporator 101 from pushing liquid 800 back into condenser 502. Both condenser chambers are rejecting thermal energy to heat-sink 500. Consequent to the evaporation and condensation, the pressure of vapor 802 in condenser 501 is increasing and the pressure of vapor 803 in condenser 502 is decreasing, thereby creating a pressure differential between the two condenser chambers. Sliding-valve 319 reacts to this differential pressure as described in the discussion of FIGS. 4 and 5 above, so that when the differential pressure reaches the predetermined magnitude, sliding-valve 319 changes position.

Figure 7:
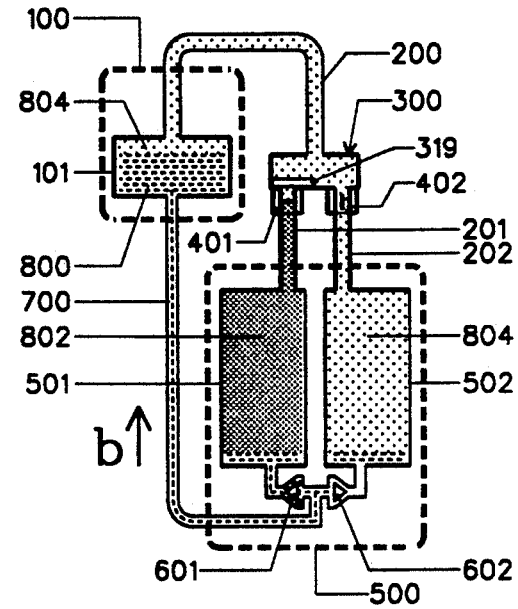

FIG. 7 shows the system immediately after sliding-valve 319 has changed position, closing the ports to condenser 501 and opening the ports to condenser 502. Upon this occurrence, the vapor pressure in evaporator 101 and condenser 502 rapidly adjust to equilibrium low vapor pressure 804 and check-valve 401 closes which prevents the higher pressure vapor 802 in condenser 501 from passing back into switch-valve 300. Since vapor pressure 802 is higher than vapor pressure 804 in evaporator 101, it pumps working fluid liquid 800 out of condenser 501, through check-valve 601, through passageway 700 in the direction indicated by arrow b, and back into evaporator 101. The pumping action continues until the vapor pressures in evaporator 101 and condenser 501 reach equilibrium.

Figure 8:
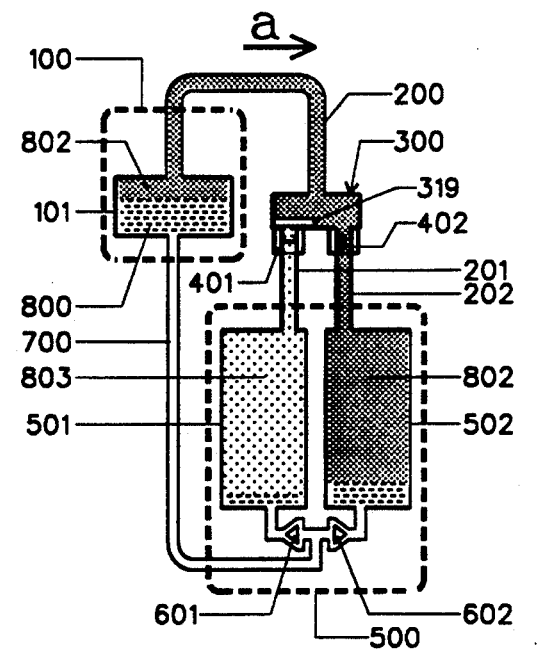

Referring to FIG. 8, which shows the system after the vapor pressure in evaporator 101 and condenser 501 have equalized and the pressurization of condenser chamber 502 is occurring. As shown, working fluid liquid 800 contained in evaporator 101 is changed into vapor 802 by virtue of thermal energy accepted into the system from heat-source 100. The vapor moves through supply passageway 200 in the direction indicated by arrow a into the switch-valve assembly 300, through vapor check-valve 402, and into condenser chamber 502. When sliding-valve 319 is in the position indicated, condenser chamber 501 is isolated from the remainder of the system so that the vapor pressure in evaporator 101 can not effect the vapor pressure in condenser 501. Further, check-valve 602 prevents the vapor pressure in evaporator 101 from pushing liquid 800 back into condenser 501. Both condenser chambers are rejecting thermal energy to heat-sink 500. Consequent to the evaporation and condensation, the pressure of vapor 802 in condenser 502 is increasing and the pressure of vapor 803 in condenser 501 is decreasing, thereby creating a pressure differential between the two condenser chambers. Sliding-valve 319 reacts to this differential pressure as described in the discussion of FIGS. 4 and 5 above, so that when the differential pressure reaches the predetermined magnitude, sliding-valve 319 changes position.

Figure 9:
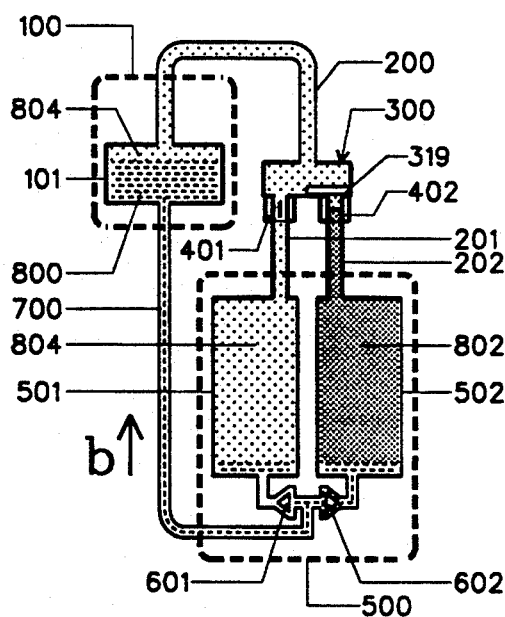

FIG. 9 shows the system immediately after sliding-valve 319 has changed position, closing the ports to condenser 502 and opening the ports to condenser 501. Upon this occurrence, the vapor pressure in evaporator 101 and condenser 501 rapidly adjust to equilibrium low vapor pressure 804 and check-valve 402 closes which prevents the higher pressure vapor 802 in condenser 502 from passing back into switch-valve 300. Since vapor pressure 802 is higher than vapor pressure 804 in evaporator 101, it pumps working fluid liquid 800 out of condenser 502, through check-valve 602, through passageway 700 in the direction indicated by arrow b, and back into evaporator 101. The pumping action continues until the vapor pressures in evaporator 101 and condenser 502 reach equilibrium.

The cyclic process shown in FIGS. 6, 7, 8, and 9 will continue, alternating between one condenser chamber and the other, as long as the heat-source and the heat-sink maintain their temperature differential; in this way the working fluid will circulate and the devise will operate to transfer thermal energy from the heat-source to the heat-sink.

FIGS. 10, 11, 12, and 13 illustrate related views of the preferred embodiment of a switch-valve assembly comprising body members, valve assembly and spring assembly in accordance with the invention. FIG. 10 shows an isometric view of the exterior of a switch-valve assembly with cut away portions revealing the mechanical workings inside. FIG. 11 illustrates an exploded isometric view of the mechanical workings depicted in FIG. 10, without the exterior shell or body. FIGS. 12 and 13 illustrate a sectional view of the spring assembly shown in FIG. 11 and indicated by section marks 12—12 thereon.

Referring to FIG. 10, which shows vapor supply passageway 210, joined to valve body cap 320 which is joined to switch-valve body 321. Body 321 is joined to condenser vapor passageway 211 and 212. The interior volume of body 321 is divided into three spaces so as to form vapor chamber 322, manifold chamber 323, and manifold chamber 324. Working fluid vapor flows from the evaporator in a direction indicated by arrow E and enters the switch-valve assembly into vapor chamber 322 through supply passageway 210, and exits from either chamber 323 or 324 through passageways 211 and 212 flowing in a direction indicated by arrows CC1 and CC2 and into one or the other condenser chamber, respectively.

Valve plate 330 is mounted to body 321 inside of chamber 322 in a manner so as to be fixed rigidly in place. Plate 330 makes a complete seal between chamber 322 and both chambers 323 and 324, so that no vapor can pass around its periphery or between the two chambers. Valve plate 330 has a smooth flat surface 335 which is exposed to chamber 322 and upon which ride sliding-valves 345a and 345b. The sliding-valves are attached to valve carriage 340 and the assembly moves back and forth between two stable positions, each position being at an extreme of the motion, in directions indicated by arrow c. Valve plate 330 has two sets of ports 331 and 332, each set comprising a plurality of apertures, which are arranged symmetrically with both primary axis of surface 335. Sliding-valves 345a, 345b have openings 346a and 346b, respectively, corresponding to the apertures of ports 331, 332. These openings are offset so that when sliding-valves 345a, 345b are in one stable position, one set of ports will be exposed through one set of openings and the other set of ports will be covered. When the valves are in the other stable position, the exposed and covered sets of ports are reversed.

Working fluid vapor travels from the system evaporator through supply passageway 210 and into vapor chamber 322. The vapor passes through ports 331, past vapor check-valves 336, through manifold chamber 323, through passageway 211, and into the respective system condenser chamber, or through ports 332, past vapor check-valves 336, through manifold chamber 324, through passageway 212, and into the respective system condenser chamber depending on the position of sliding-valves 345a and 345b. As shown in FIG. 10, ports 332 are open and the vapor will pass through freely, increasing the pressure in manifold chamber 324, passageway 212, and into the corresponding condenser chamber. Ports 331 are covered or closed and no vapor can pass through into manifold chamber 323, passageway 211, or into the corresponding condenser chamber. In all cases, below each aperture of ports 331 and 332, a vapor check-valve 336 prevents any vapor returning from either manifold chamber 323 or 324 into the switch chamber 322. In this way a pressure differential is created between manifold chambers 323 and 324.

Attached to body 321 are pressure chamber bodies 356 and 357. The interior volume of body 356 is divided by diaphragm 350a to form pressure chamber 355, and the remainder of the interior volume is open to chamber 322, effectively becoming part of that volume. Similarly, the interior volume of body 357 is divided by diaphragm 350b to form pressure chamber 358, and the remainder of the interior volume is open to chamber 322, also becoming part of that volume. Vapor pressure tube 213 interconnects pressure chamber 355 with manifold chamber 323 and vapor pressure tube 214 interconnects opposing pressure chamber 358 with manifold chamber 324. Thus any pressure differential between chambers 323 and 324 is transmitted into pressure chambers 355 and 358 and acts on diaphragms 350a and 350b.

Referring to FIG. 11, which illustrates an exploded and partial sectional isometric view of the mechanical workings of the switch-valve depicted in FIG. 10. Shown is valve plate 330 with ports 331 and 332 and attached vapor check-valves 336 and smooth flat surface 335. Cut into surface 335, along the axis of symmetry coinciding with direction indicated by arrow c, is channel 333. Channel 333 makes a track for roller bearings 344, which are further confined in recess 342 of carriage 340. Valve carriage 340 rides on bearings 344 and travels back and forth between two stable positions, each position being an extreme of the motion, in directions indicated by arrow c.

Sliding-valves 345a and 345b are attached to carriage 340 by means of pins 348 or other suitable fasteners. Pins 348 allow the valves to move perpendicular to surface 335 but prevents their movement in any other direction independent of carriage 340. This allows the sliding-valves to remain in full contact with surface 335 as they travel with the carriage.

Connecting rods 351a and 351b are screwed into threaded holes 341a and 341b in carriage 340. Rods 351a, 351b are cylindrical and integrally formed with a diaphragm piston 359a, 359b near one end. The rod protrudes on each side of the piston, extending to reach the carriage on one side and to provide a attachment for diaphragm 350a, 350b, diaphragm retainer 352a, 352b, and nut 353a, 353b on the other side.

The valve-assembly comprising diaphragms 350a, 350b, retainers 352a, 352b, nuts 353a, 353b, pistons 359a, 359b, rods 351a, 351b, carriage 340, valves 345a, 345b, and fasteners 348 moves as one unit with oscillating motion, motivated by differential pressure as described in discussion of FIG. 10.

Spring housing 380, rigidly attached to valve plate 330 using of bolts 373 through holes 374 into threaded holes 375, surrounds carriage 340. Spring housing has two bushings 381a and 381b pressure fitted into suitable holes in which rods 351a and 351b slide. These bushings align carriage 340 and restrict the carriage movement to a single axis. Cylinder hole 382 in which slides spring piston 365 is located at the center of housing 380, perpendicular to surface 335. Compression spring 364 is contained in cup shaped piston 365 and spring retainer 363 is on top of the spring. Spring cap 360 is bolted to housing 380 by bolts 370 through holes 371 into threaded holes 372, enclosing retainer 363, spring 364, and piston 365 in cylinder hole 382. A threaded hole 367 in which adjustment screw 361 is turned and held tightly by lock nut 362 is located at the center of cap 360. During assembly screw 361 is turned to increase pressure on spring retainer 363 so as to obtain the desire compression in spring 364; nut 362 is tightened against cap 360 to prevent subsequent unwanted rotation of the screw.

Cam 343, formed by a surface of carriage 340 opposite roller bearings 344, engages cam roller 366 which is firmly pressed by spring piston 365. Each end of roller 366 fits into a slot 383 in cylinder hole 382 and the displacement of the roller is thus restrained to the direction perpendicular to surface 335.

Referring to FIG. 12, which illustrates a section view through the spring assembly and valve plate 330, looking as indicated by section marks 12—12 shown in FIG. 11. FIG. 12 clearly shows the action of spring 364, piston 365 and roller 366 against cam 343 on carriage 340.

The shape of cam 343 establishes the desired character of the resistance to movement; specifically, exactly two stable positions are provided, the resistance to movement from one stable position is commensurate with the resistance to movement from the other position, and the resistance to movement is greatest while the carriage is in one or the other the stable position and negligible when the carriage is at the midpoint of its travel.

Carriage 340 is contained in a void created by recess 384 in housing 380 and the surface of channel 333 which is cut in valve plate 330. Valve carriage 340 rides on bearings 344 and travels back and forth between two stable positions, each position being at an extreme of the motion, in directions indicated by arrow c. Travel distance d is limited by the size of recess 384 and the length of carriage 340; the motion of carriage 340 is stopped by housing 380. The center of carriage 340 is offset from the centerline of the spring assembly by a distance of ½ d.

Screw 361 provides adjustment of the spring's compression and therefore, within the range of the spring force, allows adjustment of the switching pressure required to move the valve-assembly from one position to the other.

Referring to FIG. 13, which illustrates a section view through the spring assembly and valve plate 330, similar to that shown in FIG. 12, however, with carriage 340 moved to the opposite stable position.

Figure 14:
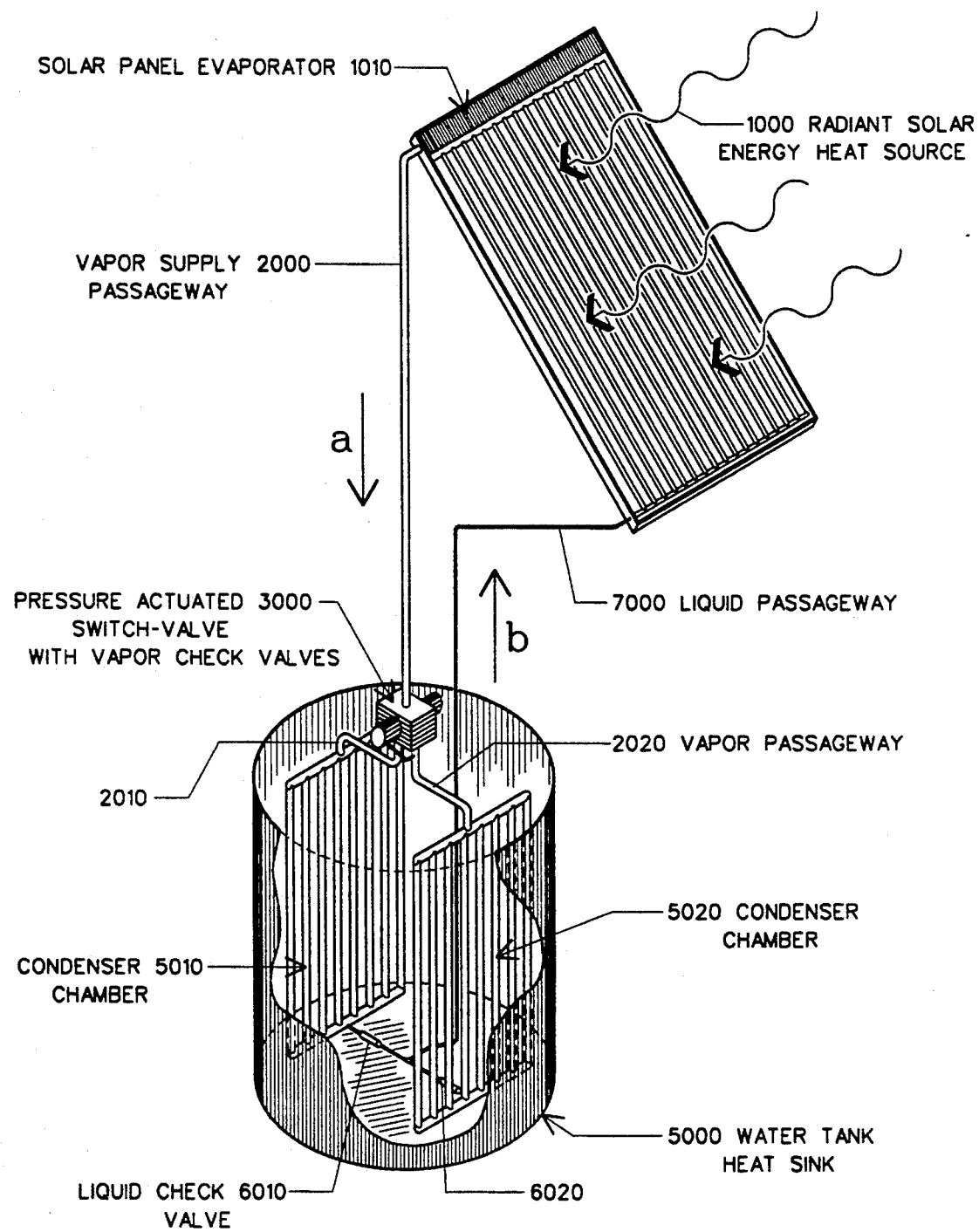
FIG. 14 depicts an isometric view of one system embodiment arranged in accordance with the invention.

Referring to FIG. 14 which illustrates an isometric view of one embodiment arranged in accordance with the invention. This embodiment is a hermetically sealed system comprising solar panel evaporator assembly 1010, evaporator vapor supply passageway 2000, pressure actuated switch-valve assembly 3000 with vapor check-valves, condenser vapor passageways 2010, 2020, condenser chamber assemblies 5010, 5020, liquid check-valves 6010, 6020, liquid passageway 7000, and working fluid which circulates therein.

In this embodiment radiant solar energy 1000 is the heat-source and water filled tank assembly 5000 is the heat-sink. The illustrated embodiment collects thermal energy using solar panel 1010 and transports it to water tank 5000 where the energy is stored as hot water.

FIG. 14 shows radiant solar energy 1000 being absorbed by a solar panel evaporator 1010. The interior volume of the panel is mostly filled with liquid so as to minimize the vapor volume. Simultaneously heat is being rejected from the condenser chambers 5010, 5020 to the water in which they are immersed, contained by water tank 5000. When the temperature of evaporator 1010 is hotter than the temperature of condenser chambers 5010 and 5020, thermal energy is absorbed by the evaporator, working fluid liquid changes into vapor. The vapor migrates from the solar panel to condenser chambers where thermal energy is rejected to the water in the tank, and the vapor condenses. The combined action of evaporation and condensation and subsequent pressure differential is the motive force causing the vapor to migrate.

As vapor leaves the evaporator it travel through supply passageway 2000 in a direction indicated by arrow a. The vapor enters switch-valve assembly 3000 and depending on the position of the internal sliding-valve, is directed through one or the other passageway 2010 or 2020 and into corresponding condenser chamber 5010 or 5020.

As described in previous discussion of FIGS. 10, 11, 12, and 13, the pressure differential created between the two condenser chambers acts on the diaphragms in switch-valve 3000 shown in FIG. 14. When the differential pressure between the two condenser chambers reaches the predetermined magnitude, it causes the sliding-valve to change position and direct vapor to the condenser chamber that was previously not receiving vapor. When this happens, the low vapor pressure in that condenser chamber causes the vapor pressure in the evaporator to drop to an equilibrium pressure, still lower than the vapor pressure of the chamber previously receiving vapor. The high pressure chamber, cut off in the backward direction by a vapor check-valve, pushes condensed working fluid through the liquid check-valve, through passageway 7000 in a direction indicated by arrow b, and back into the solar panel evaporator.

So long as the required temperature differential exists between the evaporator and condensers, this cycle will continue, alternating between one condenser chamber and the other. If the required temperature differential cannot be maintained, such as when the sun goes down, on cloudy days, or when the water is heated to a temperature approaching that of the solar panel, the operation of the invention will automatically cease. If the temperature of the condensers exceeds that of the solar panel evaporator the invention will not operate, it will not reverse cycle; that is to say, the invention will not operate to transport thermal energy from the water tank to the solar panel. Further, when the required temperature differential is re-established the invention will begin its operation automatically, that is, operate to transport thermal energy from the source to the sink.

THEORY OF THE INVENTION—FIG. 15

Figure 15:
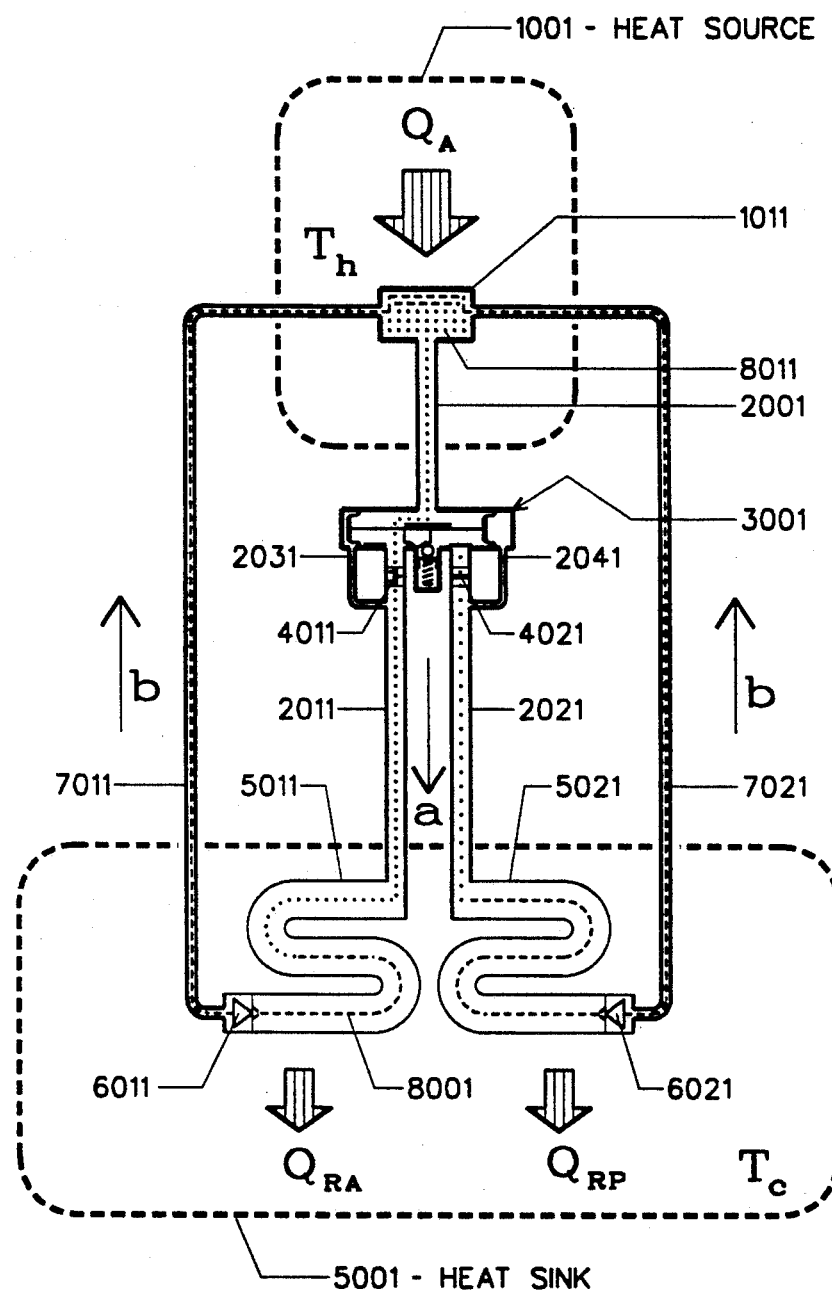
FIG. 15 depicts a schematic diagram of a generalized system arrangement in accordance with the invention.

Referring to FIG. 15 which illustrates a schematic diagram of a thermal transport system in accordance with the invention. This diagram shows heat-source 1001 and heat-sink 5001 between which is a thermal transport devise comprising evaporator 1011, vapor supply passageway 2001, switch-valve assembly 3001, vapor check-valves 4011, 4021, vapor passageways 2011, 2021, vapor pressure tubes 2031, 2041, condenser chambers 5011, 5021, liquid check-valves 6011, 6021, and liquid passageways 7011, 7021, joined together so as to form a hermetically sealed container. Inside the devise working fluid vapor 8011 moves in direction indicated by arrow a and working fluid liquid 8001 moves in directions indicated by arrows b.

The principles of the invention's operation has basis in elementary laws of thermodynamics. Accordingly, the devise accepts thermal energy from heat-source 1001 into evaporator 1011 and rejects thermal energy from condensers 5011, 5021 into heat-sink 5001. It is known that as a result of these transactions, the working fluid inside the devise experiences a phase-change cycle, from the liquid state to the vapor state and from vapor back to liquid. This evaporation and condensation action is the motive power for the vapor movement. Further, by means of migration of working fluid vapor 8011, thermal energy is transported from the evaporator to the condensers.

It is known that when a quantity of thermal energy undergoes a change in temperature from a higher temperature to a lower temperature, a potential for mechanical action is created. By providing appropriate apparatus, namely a devise of this invention, this potential may be applied to perform useful work; specifically, to return working fluid liquid 8001 from condensers 5011, 5021 to evaporator 1011. The degradation of thermal energy, or the change in temperature of thermal energy that has passed through the system provides the motive power for the liquid movement.

It is known that in a closed system containing a vapor, the vapor pressure is directly related to the vapor temperature, so that, as the vapor temperature increases the vapor pressure experiences a corresponding increase. As thermal energy is absorbed by such a system, the temperature of that system will increase, consequently the internal vapor pressure will increase; conversely, as thermal energy is rejected by such system, the temperature and vapor pressure will decrease. Obviously, if thermal energy is rejected as quickly as it is absorbed, the vapor temperature and pressure will remain constant. On the other hand, if thermal energy is accepted faster than it is rejected, the system temperature will tend to increase until it is sufficient to reject thermal energy at the same rate as it is accepted.

The following nomenclature is used in this discussion of FIG. 15:

$T_h$—meaning the temperature of the heat-source 1001, which is hot relative to the temperature of the heat-sink.

$T_c$—meaning the temperature of the heat-sink 5001, which is cold relative to the temperature of the heat-source.

$\Delta T$—meaning the magnitude of the temperature differential between heat-source 1001 and heat-sink 5001 (i.e. $T_h - T_c$).

C:E—meaning the ratio of the sum of the vapor volumes of either condenser 5011 and passageway 2011, or that of condenser chamber 5021 and passageway 2021 to: the sum of the vapor volumes of evaporator 1011, supply passageway 2001, and switch-valve 3001.

Active chamber—meaning the condenser chamber that is currently selected by the switch-valve and receives fresh vapor from the evaporator.

Passive chamber—meaning the condenser chamber that is currently blocked by the switch-valve and does not receive fresh vapor from the evaporator.

$\Delta P$—meaning the magnitude of the pressure differential between the active chamber and the passive chamber.

$\Delta P_s$—meaning the pressure differential at which the switch-valve will change the direction of vapor flow from one condenser chamber to the other.

$\Delta P_r$—meaning the resulting pressure differential between the active chamber and the evaporator immediately after the switch-valve changes the vapor flow, where the evaporator pressure is essentially the equilibrium pressure of the evaporator and the passive chamber.

$Q_A$—meaning the amount of thermal energy being accepted into the evaporator from the heat-source.

$Q_{RA}$—meaning the amount of thermal energy being rejected out the active condenser chamber to the heat-sink.

$Q_{RP}$—meaning the amount of thermal energy being rejected out of the passive condenser chamber to the heat-sink.

In order to analyze the development of the pressure differential $\Delta P$ between the active and passive chambers so as to better understand the invention's operation, consider a condition of non-operation, when the temperature of the heat-source is lower that the temperature of the heat-sink. Under these conditions, if the devise had no internal obstructions, the vapor in the condensers would migrate to the evaporator. However, vapor check-valves 4011 and 4021 prevent this action. At this time both condenser chambers will have the temperature of the surrounding heat-sink and the internal vapor pressure of the chambers will be equal to each other. Accordingly, the condenser chambers' vapor temperature and pressure are at their lowest value.

As the temperature of heat-source 1001 rises, thermal energy is accepted at evaporator 1011 and the temperature of the vapor inside the evaporator increases. When the temperature of the heat-source exceeds that of the heat-sink the vapor pressure of the active chamber will increase in conjunction with that of the evaporator, thereby developing $\Delta P$ between the active and passive chambers. As long as $Q_A$ exceeds $Q_{RA}$, the vapor pressure in the active chamber will continue to increase until such time as $\Delta P$ equals $\Delta P_s$.

There are two system parameters that determine the quantity of working fluid liquid 8001 that will be returned to the evaporator; namely $\Delta P_r$ and C:E. These variables modify the magnitude and duration of the force that pumps the liquid back to the evaporator. The switching pressure $\Delta P_s$, more specifically $\Delta P_r$ must be great enough to overcome the resistance to movement of the liquid due to viscous and gravitational forces; thus the necessary valve of $\Delta P_r$ depends greatly on the relative locations of the evaporator and condenser. C:E must be large enough to sustain the liquid movement until at least as much working fluid mass is returned to the evaporator as liquid as was received by the condenser as vapor. In general, a C:E ratio of 10:1 is appropriate; however, the exact conditions of use may dictate another ratio, either larger or smaller.

$\Delta P_r$ is determined by $\Delta P_s$ and C:E. Switch-valve 3001 changes the flow of vapor from one chamber to the other when $\Delta P$ equals $\Delta P_s$. When this happens, the vapor pressure in the previously passive chamber and the vapor pressure in the evaporator rapidly adjust to intermediate pressure based on the ratio of their vapor volumes, C:E. As defined, $\Delta P_r$ equals the high vapor pressure in the previously active chamber minus this lower intermediate pressure. Obviously, if the vapor volume of a single condenser chamber is much greater than the vapor volume of the evaporator, $\Delta P_r$ will be larger and close in valve to $\Delta P_s$.

The ratio C:E also determines the duration of the push on the liquid. The pumping pressure initially has its highest value $\Delta P_r$. This pressure is then diminished due to the volume of liquid displaced and the recovery of vapor pressure from continued evaporation. As long as the pumping pressure is sufficient to overcome the resisting forces in the liquid, it will continue to push liquid to the evaporator, that is until substantially all of the liquid is returned and blow-through occurs.

$\Delta T$ is a measure of the available energy that can be put to use by a devise of this invention; $\Delta T$ determines the distance which such a devise can transport thermal energy as well as the rate of thermal transfer. Thus, the larger the magnitude of $\Delta T$, the further the evaporator and condenser can be separated, or alternately, the greater the rate of thermal transfer that can be achieved.

CONCLUSION, RAMIFICATIONS AND SCOPE OF INVENTION

While the above description contains many specificities, these should not be construed as limitations to the scope of the invention, but rather as an exemplification of embodiments thereof. The exact geometry, arrangement and size, of a devise fabricated in accordance with the invention will be different from one application to another; however, the essential members and the principles of operation will be consistent. For example, the distance (vertical and horizontal) separating the heat-source and heat-sink, the temperature difference between the source and sink, the quantity of thermal energy that is required to be transported, or the actual environment of the source (i.e. a furnace, a chimney, an engine, a solar panel, etc.) as well as the actual environment of the sink (i.e. ambient air, a water tank, an industrial process, deep space, etc.), will undoubtedly vary between applications of the invention. For these reason, various embodiments suiting the requirements of the applications will look different. However, the comprising members, as defined and described in the preceding discussion and illustrated in the drawings, will of necessity be included in a devise of this invention. Further, the motivating force that returns liquid from the condenser chambers to the evaporator, specifically an internally created pressure differential between two separate condenser chambers, will be analogous in all embodiments.

The invention has a wide range of application; it is useful for transporting thermal energy to a specific location, such as a solar hot water heater; it is useful for recovering thermal energy that would otherwise be lost to the environment, such as heat recovery from a chimney in a multiple process industrial setting; it is useful for balancing the thermal load between two locations, such as the hot and cold side of a space station orbiting the earth; and, it is useful for the removal of unwanted heat from temperature sensitive components, such as motors, electronic circuits and apparatus. The invention has use wherever there exists a heat-source and heat-sink with an appropriate temperature differential and a corresponding desire to transport thermal energy between the two zones.

From the description it is seen that the invention provides a thermal energy transport devise that is self-starting, and once in operation is self-regulating; that can transport thermal energy in opposition to gravitational forces; that operates with a high degree of reliability; that will not reverse cycle; and that operates without supplementary energy source such as electricity or gravity.

Obviously, many variations of embodiment are possible. Accordingly, it is understood that the present invention is not limited to the embodiments illustrated or any particular modification thereof; the present invention is intended to include in its scope all modifications within the spirit and scope of the appended claims.

I claim as new and desire to secure by Letter's Patent of the United States the following:

1. In an environment having a hot zone and a cold zone, a thermal energy transport devise comprising:
    an evaporator, a vapor supply passageway, a pressure actuated switch-valve, a first and second vapor check-valve, a first and second vapor passageway, a first and second condenser, a first and second liquid check-valve, a first and second liquid passageway, and a two-phase working fluid existing in liquid and vapor states;
    said condensers being identical in shape, surface area, and volume;
    said evaporator joined to said vapor supply passageway interconnecting and joined to said switch-valve, said switch-valve joined to said first vapor passageway interconnecting and joined to said first condenser with said first vapor check-valve interposed, said switch-valve joined to said second vapor passageway interconnecting and joined to said second condenser with said second vapor check-valve interposed, said first condenser joined to said first liquid passageway interconnecting and joined to said evaporator with said first liquid check-valve interposed, said second condenser joined to said second liquid passageway interconnecting and joined to said evaporator with said second liquid check-valve interposed, with the junctures being made so as to obtain a hermetically sealed container and with interior volume of said container filled with said working fluid liquid and vapor.

2. A thermal energy transport devise as defined in claim 1 wherein said pressure actuated switch-valve comprises:
    a vapor chamber, a smooth flat valve plate having a first and second port set, said port sets each consisting of a plurality apertures having an equal number of apertures in each set, and said port sets located symmetrically with respect to the center of said valve plate;
    a first manifold chamber separated from said vapor chamber by said valve plate with said first port set opening into said first manifold with opening into said first vapor passageway, and a second manifold chamber separated from said vapor chamber by said valve plate with said second port set opening into said second manifold with opening into said second vapor passageway;
    a first and second cylindrical pressure chamber, a first pressure sensing means for transferring pressure force dividing said first pressure chamber from said vapor chamber, a first pressure duct interconnecting said first pressure chamber with said first vapor passageway at a point downstream past said first vapor check-valve, a second pressure sensing means for transferring pressure force dividing said second pressure chamber from said vapor chamber, and a second pressure duct interconnecting said second pressure chamber with said second vapor passageway at a point downstream past said second vapor check-valve;
    a valve carriage with a roller bearing means for reducing sliding friction and a carriage cam part on side opposite said bearing means, said bearing means rolling on said valve plate;
    a first and second connecting rod means for translating the pressure force of said first and second pressure sensing means into oscillating movement of said carriage, one end of said first rod means attached to the center of said first pressure sensing means and the other end of the rod extending to and attached to said carriage, one end of said second rod means attached to the center of said second pressure sensing means and the other end of the rod extending to and attached to said carriage, said rods being substantially cylindrical members having axial center determining the direction of movement of said carriage;
    a sliding-valve means for alternately opening and closing said port sets to said vapor chamber thereby directing said working fluid through one or the other said first and second port sets and providing a positive vapor seal to the closed apertures, said sliding-valve means riding on said valve-plate, said sliding-valve means attached to said carriage and acquiring the oscillating movement of the carriage;
    a spring means for resisting the movement of said carriage with roller means for engaging said carriage cam part;
    and a housing means having a bushing means for aligning said first and second connecting rods and restricting the movement of the rods to a single axis, said housing means providing a stable structure containing the action of said spring means, said housing means having a void enclosing the movement of said carriage, and said housing means parts providing stops to the motion of said carriage;

wherein the combination of said housing means, said spring means and said carriage cam provide two stable positions for a valve-assembly comprising said valve carriage, said sliding-valve means, said first and second connecting rods, and said first and second flexible means.

3. The method of circulating a two-phase working fluid inside a thermal energy transport devise;

wherein said transport devise comprises: an evaporator within a hot zone, a first and second condenser within a cold zone, a pressure actuated switch-valve at an intermediate location, a vapor supply passageway interconnecting said evaporator and said switch-valve, a first vapor passageway with interposed vapor check-valve interconnecting said switch-valve and said first condenser, a second vapor passageway with interposed vapor check-valve interconnecting said switch-valve and said second condenser, a first liquid passageway with interposed liquid check-valve interconnecting said first condenser and said evaporator, a second liquid passageway with interposed liquid check-valve interconnecting said condenser and said evaporator, with members joined at their peripheries forming a hermetically sealed system containing a two-phase working fluid existing in liquid and vapor states;

wherein said switch-valve comprises: a valve-assembly means for exclusively directing vapor flow to one or the other said first and second vapor passageway, and a pressure differential measuring means for causing said valve-assembly means to change the direction of vapor flow when the measured pressure difference reaches a predetermined magnitude;

and said method comprises the following steps:

vaporize said working fluid liquid within said evaporator by continuously acquiring thermal energy from said hot zone;

condense said vapor within said first and second condensers by continuously rejecting thermal energy to said cold zone;

provide motive force for vapor migrating through said vapor supply passageway into said switch-valve by said vaporization and condensation action;

direct said vapor by said valve-assembly means through said first vapor passageway and past said first vapor check-valve and into said first condenser, thereby increasing the vapor pressure in said first condenser and said first vapor passageway, and creating a pressure differential between said first and second condensers;

transmit said pressure differential to said pressure differential measuring means until said differential pressure causes said valve-assembly means to change the direction of said vapor flow to said second vapor passageway, and allow the vapor pressure of the open internal volumes to equalize creating a resultant pressure differential between said first condenser and said evaporator;

pump the condensate past the said first liquid check-valve, and through said first liquid passageway into said evaporator by said resultant pressure differential until internal pressures are equal;

direct said vapor by said valve-assembly means through said second vapor passageway and past said second vapor check-valve and into said second condenser, thereby increasing the vapor pressure in said second condenser and said second vapor passageway, and creating a pressure differential between said second and first condensers;

transmit said pressure differential to said pressure differential measuring means until said differential pressure causes said valve-assembly means to change the direction of said vapor flow to said first vapor passageway, and allow the vapor pressure of the open internal volumes to equalize creating a resultant pressure differential between said second condenser and said evaporator;

pump the condensate past the said second liquid check-valve, and through said second liquid passageway into said evaporator by said resultant pressure differential until internal pressures are equal;

and repeat these steps in a continuous cycle.

* * * * *